(12) United States Patent
Difante

(10) Patent No.: US 8,707,859 B2
(45) Date of Patent: Apr. 29, 2014

(54) STOCK POT WITH FITTED STRAINER-BASKET

(76) Inventor: Agostino Difante, San Clemente, CA (US)

( * ) Notice: Subject to any disclaimer, the term of this patent is extended or adjusted under 35 U.S.C. 154(b) by 202 days.

(21) Appl. No.: 13/373,639

(22) Filed: Nov. 22, 2011

(65) Prior Publication Data

US 2013/0125765 A1 May 23, 2013

(51) Int. Cl.
*A47J 36/18* (2006.01)
(52) U.S. Cl.
USPC .......... 99/403; 99/410; 99/411; 99/412; 99/413; 99/414; 99/415; 99/340; 99/523
(58) Field of Classification Search
USPC .............. 99/410–415, 403, 340, 523
See application file for complete search history.

(56) References Cited

U.S. PATENT DOCUMENTS

| | | | | |
|---|---|---|---|---|
| 1,004,423 | A * | 9/1911 | Hanlon et al. | 220/759 |
| 1,023,645 | A * | 4/1912 | Hanilton | 99/410 |
| 1,238,688 | A * | 8/1917 | Kinkel | 99/412 |
| 2,188,563 | A * | 1/1940 | Anzalone | 99/413 |
| 2,307,408 | A * | 1/1943 | Kent | 134/158 |
| 2,555,720 | A * | 6/1951 | Wiegel | 99/413 |
| 2,588,614 | A * | 3/1952 | Capra et al. | 99/410 |
| 2,753,436 | A * | 7/1956 | Schwaneke | 219/441 |
| 2,785,277 | A * | 3/1957 | Jepson | 219/442 |
| 3,508,485 | A * | 4/1970 | Munsey | 99/331 |
| 4,401,017 | A * | 8/1983 | Feld | 99/413 |
| 4,574,776 | A * | 3/1986 | Hidle | 126/369 |
| 4,604,989 | A * | 8/1986 | Kita | 126/369 |
| 4,626,352 | A * | 12/1986 | Massey et al. | 210/469 |
| 4,714,012 | A * | 12/1987 | Hernandez | 99/444 |
| 5,287,798 | A * | 2/1994 | Takeda | 99/413 |
| D349,420 | S * | 8/1994 | Hasuike | D7/360 |
| 5,402,714 | A * | 4/1995 | Deneault et al. | 99/416 |
| 5,653,881 | A * | 8/1997 | Bruss et al. | 210/467 |
| 5,662,026 | A * | 9/1997 | Prakasa | 99/413 |
| 5,730,045 | A * | 3/1998 | Delaquis et al. | 99/337 |
| 5,826,494 | A * | 10/1998 | Wang | 99/340 |
| 5,918,535 | A * | 7/1999 | Moreau | 99/413 |
| 6,055,901 | A * | 5/2000 | Gantos et al. | 99/412 |
| 6,103,291 | A * | 8/2000 | Fernandez Tapia | 426/523 |
| 6,269,737 | B1 * | 8/2001 | Rigney et al. | 99/339 |
| 6,314,869 | B1 * | 11/2001 | Bourgeois, Jr. | 99/340 |
| 6,446,545 | B2 * | 9/2002 | Rigney | 99/339 |
| 6,546,849 | B1 * | 4/2003 | Shimazaki | 99/413 |
| 6,568,314 | B1 * | 5/2003 | Stepanova | 99/340 |

(Continued)

OTHER PUBLICATIONS

Non-Final Office Action Dated Jul. 2, 2013 in U.S. Appl. No. 13/200,275.

(Continued)

*Primary Examiner* — Henry Yuen
*Assistant Examiner* — Jimmy Chou
(74) *Attorney, Agent, or Firm* — Robert D. Buyan; Stout, Uxa, Buyan & Mullins, LLP

(57) ABSTRACT

Apparatus for cooking foods such as stock or pasta, rice including a container which receives a liquid to be heated and a cooking strainer-basket partially submerged in the liquid for cooking within the container, the container and the strainer-basket configured with cooperating selectively engaging support members for alternatively positioning of the strainer-basket in the liquid for cooking of the food and repositioning of the strainer-basket above the liquid to provide for straining of the food.

21 Claims, 4 Drawing Sheets

(56) References Cited

U.S. PATENT DOCUMENTS

| | | | | |
|---|---|---|---|---|
| D639,109 S | * | 6/2011 | Molayem | D7/356 |
| D640,896 S | * | 7/2011 | Molayem | D7/356 |
| D642,421 S | | 8/2011 | Difante | |
| D646,525 S | * | 10/2011 | Molayem | D7/548 |
| D653,073 S | | 1/2012 | Difante | |
| D653,074 S | | 1/2012 | Difante | |
| D658,424 S | | 5/2012 | Difante | |
| D658,425 S | | 5/2012 | Difante | |
| 2004/0216620 A1 | * | 11/2004 | Quiggins et al. | 99/413 |
| 2012/0174798 A1 | * | 7/2012 | Kulikowski | 99/340 |
| 2012/0216683 A1 | | 8/2012 | Difante | |
| 2012/0240790 A1 | * | 9/2012 | Difante | 99/413 |
| 2013/0074702 A1 | | 3/2013 | Difante | |

OTHER PUBLICATIONS

Non-Final Office Action Dated Apr. 10, 2013 in U.S. Appl. No. 12/932,357.

* cited by examiner

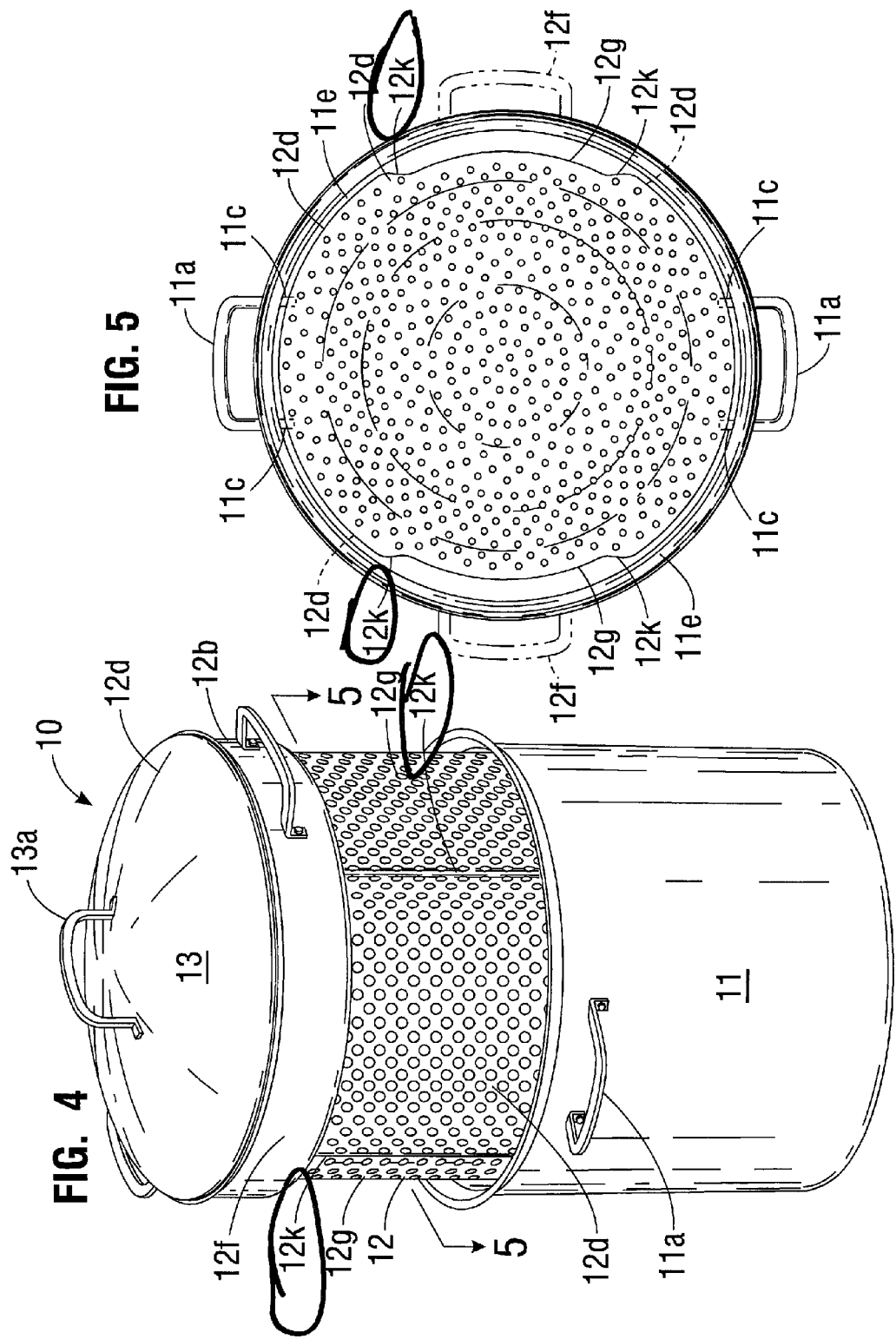

US 8,707,859 B2

STOCK POT WITH FITTED STRAINER-BASKET

BACKGROUND

The background of the invention will be discussed in two parts.

FIELD OF INVENTION

The present invention relates in general to apparatus for cooking foods such as stock or pasta and more particularly to a circular container having liquid to be heated therein, and a fitted generally circular cooking strainer-basket, the container and strainer-basket configured with cooperating support members for positioning of the strainer-basket within the liquid in the container for cooking of the food and repositioning of the strainer-basket above the liquid within the container for straining of the food.

PRIOR ART

Apparatus for cooking and/or straining of pasta and the like have become commonplace and a variety of such apparatus are known in the art, however, prior art devices are inefficient, difficult to work with, and unsafe. It is a feature of the present invention to provide a new and improved cooking apparatus for cooking and for straining of food that is more easy to use, more efficient, safer, and more economical than prior art devices. It is another feature of the invention to provide cooking and straining apparatus that does not require removal of the cooking basket from the container for straining of the food. Other objects of the invention will become apparent with reading of the specification taken with the drawings wherein there is shown and described the apparatus of the invention.

SUMMARY

The present invention provides apparatus for cooking stock and or foods such as pasta and includes a container which receives a liquid, such as water, to be heated and a cooking strainer-basket within the container which is submerged in the liquid for cooking. The container includes inwardly extending support members selectively placed along its interior surface, and the fitted cooking basket includes inwardly extending, or recessed, generally circular sections for positioning of the basket in the water, oil, or other liquid, for cooking of the food, and repositioning of the basket above the water, oil, or other liquid, to provide for straining of the food.

DRAWINGS

Figure 1:
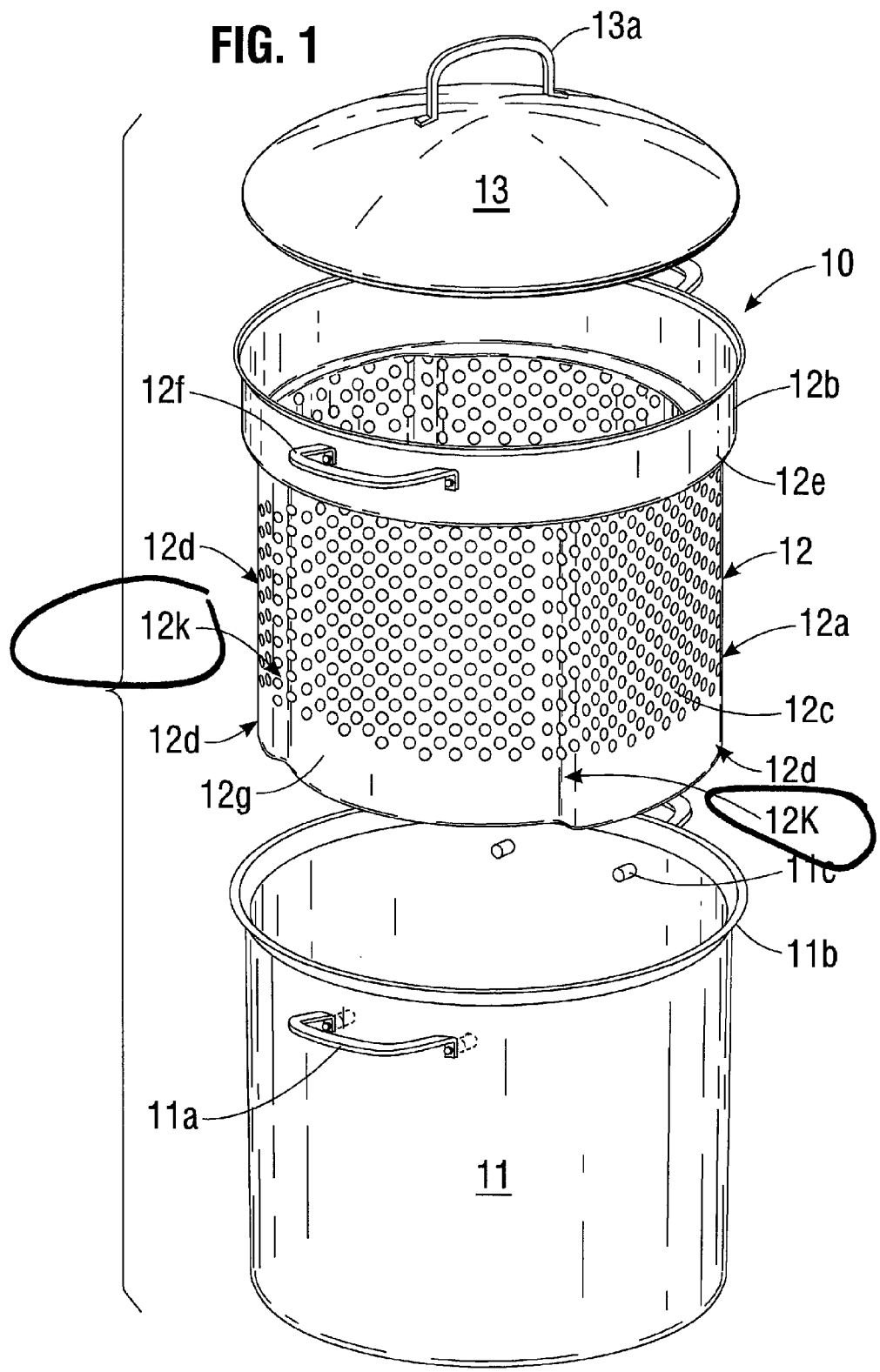
FIG. 1 is an exploded view of the cooking apparatus in accordance with the present invention.
Figure 6:
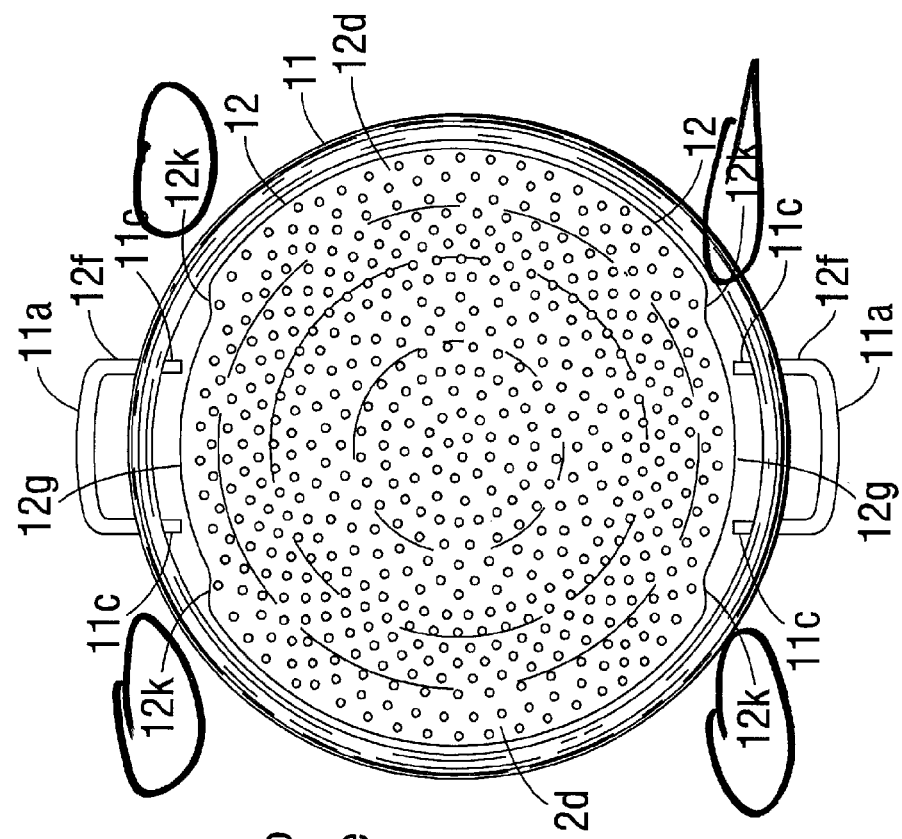
Figure 7:
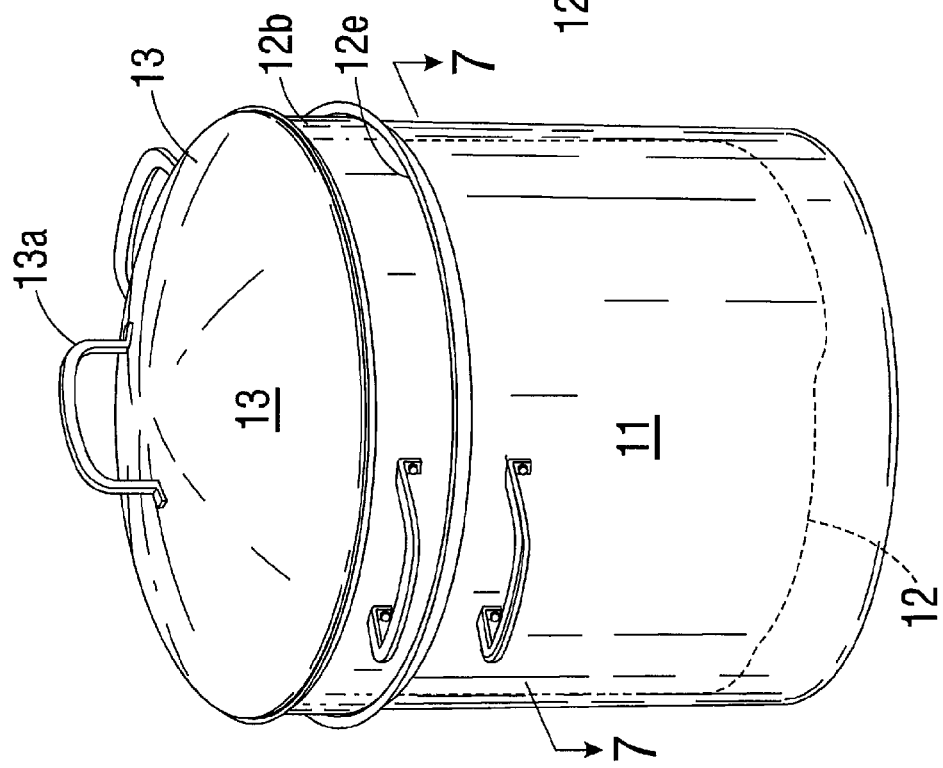

FIG. 4 illustrates the strainer-basket of FIG. 1 positioned above the cooking liquid for straining of food. As positioned, the inwardly extending container support members and the inwardly extending, or recessed, semi-circular sections of the strainer-basket are positioned out of alignment with strainer-basket recessed sections so that the strainer-basket is free to be positioned above the liquid for straining of the food;

FIG. 5 is a top view showing the positioning of the recessed sections of the strainer-basket rotated and misaligned with the container support members (shown dotted below) allowing for the strainer-basket to be raised and supported at the food straining position within the container;

FIG. 6 illustrates the apparatus of the invention with the container support members, and the inwardly extending (recessed) semi-circular section of the strainer-basket rotated and aligned with the container support members allowing for the strainer-basket to clear the container support members and to be fully inserted into the container and ready for storage or cooking; and transport; and FIG. 7 is a top view showing the positioning of the inwardly extending semi-circular section of the strainer-basket rotated to clear the container support members allowing for insertion of the strainer-basket into the container for cooking of food.

DESCRIPTION

Referring now to the drawings in general, and particularly to FIG. 1, there is shown in exploded view, the stock pot cooking apparatus of the invention, generally designated 10. The cooking apparatus 10 includes a circular container 11, a circular cooking strainer-basket generally designated 12, having a lower portion 12a with a diameter less than the inside diameter of container 11 for fitting within container 11, an upper circumferential portion 12b with a diameter greater than the outside diameter of container 11 and configured with a shoulder-like projection extending outwardly from the top of container 11 to restrain insertion of strainer-basket 12 into container 11, and lid 13 for fitting over the upper portion 12b of strainer-basket 12. Container 11 includes two side handles 11a (for smaller stock pots only one handle may be needed), a continuous outwardly extending top lip 11b, and interior support members 11c. Support members 11c are selectively spaced intermittently around the interior of the container and extend generally perpendicularly inwardly from the interior wall of container 11. Strainer-basket 12 includes selectively positioned supporting sections 12d and inwardly extending (recessed) semi-circular sections 12g such that when the strainer-basket 12 is rotated from alignment with container support members 11c restrict the container opening to prevent lowering of the strainer-basket within the container 11, and to support strainer-basket 12 above the cooking liquid for straining of food. As shown, the inwardly extending (recessed) semi-circular sections 12g have substantially vertical edges 12k against which support members 11c abut, thereby limiting rotation of the strainer-basket 12 when the strainer-basket 12 is in the submersed position shown in the figures, including FIG. 7. The strainer-basket may then be lifted to a height where support members 11c are below the strainer-basket 12, partially rotated to a position where support members 11c are below the supporting sections 12d and then lowered to a draining position, shown in the figures, including FIGS. 4 and 5, wherein the strainer-basket bottom 12h in the area of support sections 12d rests on the support members 11c, thereby holding the strainer-basket 12 in a draining position above to cooking liquid. As indicated in dotted lines on FIG. 2 the bottom 12h of strainer-basket 12 may be concave upward into strainer-basket 12 to help eliminate water surface tension.

Lower portion 12a of strainer-basket 12 is shown to include selectively placed apertures 12c, semi-circular sections 12d, and inwardly extending, or recessed, semi-circular sections 12g. The term "selectively placed apertures 12c" may include an absence of apertures 12c. Recessed sections 12g are generally semi-circular and extend inwardly from the exterior wall 12d of strainer-basket lower section 12a. Upper portion 12b includes a circumferentially configured outwardly extending upper portion 12e. Upper portion 12b includes two handles 12f (one handle for smaller version). Lid 13 includes top handle 13a. Strainer-basket 12 is positionable within container 11 such that non-supporting inwardly extending semi-circular sections 12g do not overlay container support members 11c but disengage to clear and form an opening for strainer-basket 12 to pass into the cooking liquid. Conversely, strainer-basket 12 may be positioned within container 11 such that sections 12d sufficiently overlay container support members 11c to restrict the opening to prevent passage of strainer-basket 12 and thus provide support for draining of strainer-basket 12.

Figure 2:
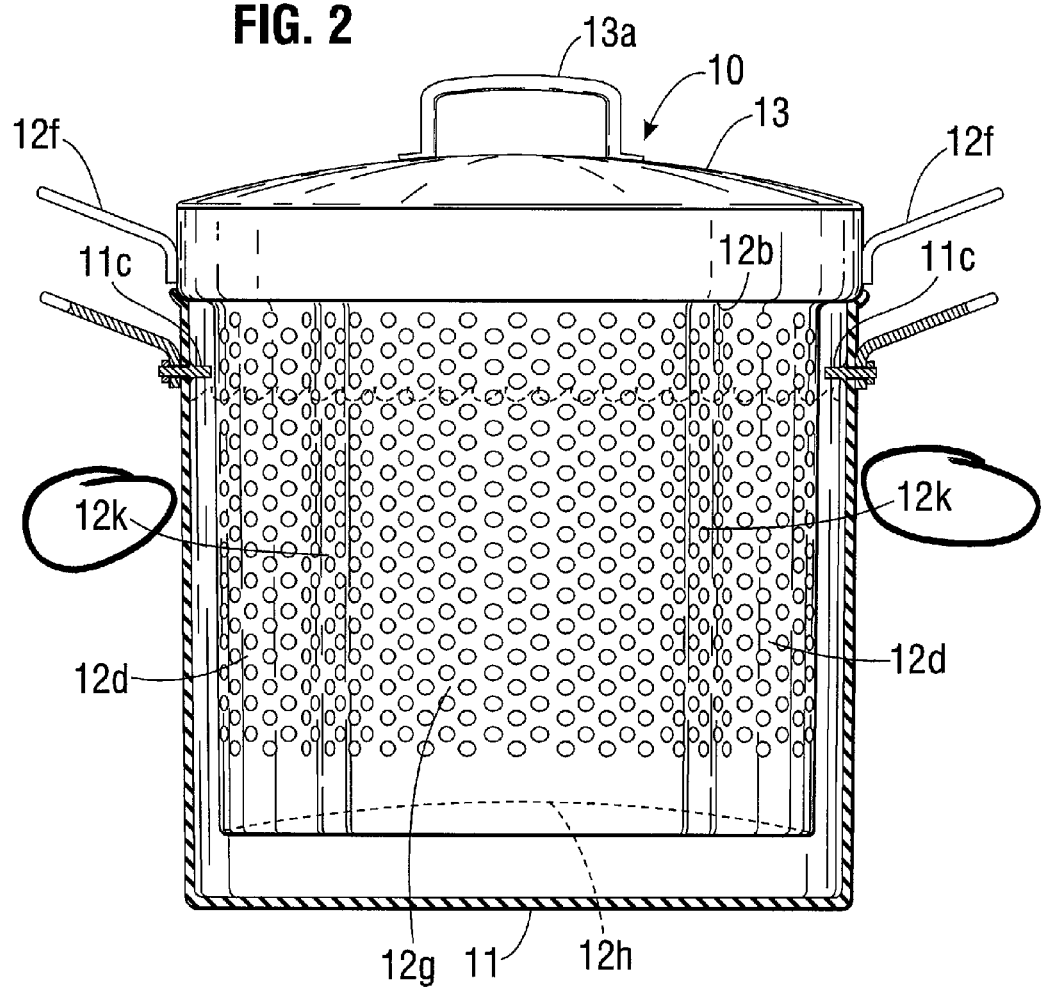
FIG. 2 illustrates in cross-sectional view the cooking strainer basket of FIG. 1 submerged in the liquid for cooking of food.

FIG. 2 illustrates in cross-sectional view the cooking-strainer basket 12 of FIG. 1 submerged in liquid such as water (indicated by wavy lines) for cooking of food. The support members 11c of container 11 and non-supporting sections 12g of strainer-basket 12 have been disengaged to form an opening permitting the lower portion 12a of strainer-basket 12 to be inserted into container 11 until upper portion 12b is sitting within lip 11b of container 11. In this position the food strainer-basket 12 is submerged for cooking. In this figure it is more clearly seen, in dotted lines, how the bottom 12h may be concave upward within strainer-basket 12 to help in eliminating water surface tension. It is to be understood that the position of the strainer-basket bottom 12h, liquid level within the container 11, depth of the strainer-basket 12, location of the container 11 and strainer-basket 12 support members, and semi-circular sections 12d and 12g, may be varied within the scope of the invention.

Figure 3:
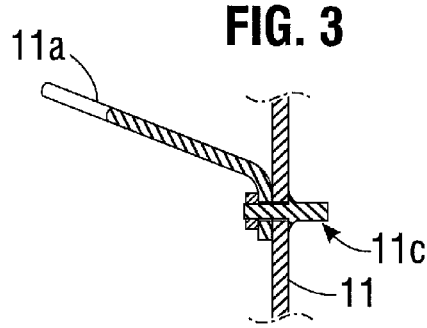
FIG. 3 illustrates in cross-sectional view one configuration of the container support members and the handle of the container.

FIG. 3 illustrates a cross-sectional view of one configuration of the container support members of container 11 that support the circumferentially supporting sections 12d of strainer-basket 12. In this Figure it is also shown how the handle 11a may be constructed so that the container support members 11c may also support the handle 11a.

FIG. 4 shows strainer-basket 12 positioned in the food straining position above the liquid in container 11. As indicated by the arrows 5, strainer-basket 12 has been rotated into position so that the circumferentially supporting sections 12d overlay the container support members 11c on container 11. That is, supporting sections 12d are rotated into a position to overlay container support members 11c, so as to restrict the opening to thereby prevent passage of strainer-basket 12, and thus provide support for draining of strainer-basket 12.

FIG. 5 is a top view showing the positioning of the supporting sections 12d of strainer-basket 12 above and overlaying the container support members 11c of container 11 allowing for the strainer-basket to be raised and supported at the food straining position within the container 11.

FIG. 6 illustrates the apparatus of the invention with the container support members 11c of container 11, and the inwardly extending sections 12g in the open position (disengaged) to clear an opening wherein strainer-basket 12 is fully inserted into container 11 until the upper portion 12b is sitting on lip 11b of container 11. FIG. 6 further illustrates that full insertion of the strainer-basket may leave an open area between the bottoms of the strainer basket and the bottom of the container. In this manner the apparatus of the invention is closed for cooking, storage, and or transport.

FIG. 7 is a top view of the apparatus 10 of the invention with the lid 13 removed to show the open, or disengaged, positioning of the inwardly extending non-supporting sections 12g of strainer-basket 12 and support members 11c of container 11, thus forming of an opening for strainer-basket 12 to be inserted fully into container 11. In this positioning the upper portion 12b is sitting within lip 11b of container 11.

While the principles of the invention have been described and illustrated in a single embodiment, it will be obvious to those skilled in the art that many modifications of structure, arrangement, proportions, materials, and components used in the practice of the invention can be particularly adapted for specific environments and operating requirements without departing from these principles.

What is claimed is:

1. A system for cooking food, said system comprising:
a container having a top opening, a floor, a side wall and an inner cavity within which liquid may be placed such that the liquid partially fills the inner cavity;
a strainer-basket that is insertable through the top opening and into the inner cavity of the container, said strainer-basket having a side wall with indented regions formed therein, said indented regions having substantially vertical lateral edges; and
support members on the container comprising pins configured to engage at least one engagement surface on the strainer-basket;
the strainer-basket being initially insertable to a submersed position within the inner cavity such that the support members protrude into the indented regions, rotation of the strainer-basket is limited by abutment of the support members against the lateral edges of the indented regions and a lower portion of the strainer-basket becomes submersed within liquid that partially fills the inner cavity;
the strainer-basket being subsequently moveable from said submersed position to a draining position by i) vertically lifting the strainer-basket to a position where the support members are no longer within the indented regions and, thus, rotation of the strainer-basket is no longer limited by abutment of the support members against the lateral edges of the indented regions, ii) partially rotating the strainer-basket to a rotational orientation in which the support members are aligned with at least one support member engaging surface on the strainer-basket and iii) lowering the strainer-basket such that at least one support member engaging surface rests on said support members so as to support the entire strainer-basket above liquid that partially fills the inner cavity.

2. A system according to claim 1 wherein the container has handles which are aligned with the support members strainer-basket is moveable from the submersed position to the draining position by lifting, partially rotating and then releasing the strainer-basket, wherein the partial rotation of the strainer-basket causes the support members on the container to engage at least one corresponding support member engaging surface on the strainer-basket so as to support the entire strainer-basket above liquid that partially fills the inner cavity.

3. A system according to claim 1 wherein the support members protrude inwardly from the container side wall.

4. A system according to claim 3 wherein the indented regions are formed at diametrically opposite locations on the strainer-basket and the support members protrude inwardly from the container side wall at diametrically opposite locations such that the support members are receivable within the indented regions.

5. A system according to claim 3 wherein the support members comprise pins.

6. A system according to claim 3 wherein handles are affixed to the exterior of the container side wall and wherein the support members serve to affix the handles to the container side wall of the container as well as being operative to engage at least one corresponding support member engaging surface on the strainer-basket when the strainer-basket is in the draining position.

7. A system according to claim 1 wherein the indented regions additionally have top edges and each indented region extends from the bottom of the bottom of the strainer-basket to the top edge thereof strainer-basket has areas of reduced diameter, the strainer-basket being initially insertable to the submersed position while the strainer-basket is in a first rotational orientation such that the areas of reduced diameter are aligned with the support members, the alignment of the support members with the areas of reduced diameter allowing the strainer-basket to pass downwardly to the submersed position; and the strainer-basket is thereafter moveable from the submersed position to the draining position by lifting, partially rotating and then releasing the strainer-basket, the partial rotation of the strainer-basket causing the areas of reduced diameter to no longer be aligned with the support members thus allowing a bottom surface of the strainer-basket to rest on the support members and thereby holding the strainer-basket in the draining position.

8. A system according to claim 3 wherein the container has handles which are aligned with the support members wherein the areas of reduced diameter comprise indentations in strainer-basket.

9. A system according to claim 8 wherein the handles, support members and indentations are aligned with each other when the strainer-basket is in the submersed position, formed at diametrically opposite locations on the container and strainer-basket respectively.

10. A system according to claim 1 wherein the container and strainer-basket are further configured such that, when the strainer-basket is inserted to the submersed position, the strainer-basket is supported so that a lower portion of the strainer-basket is submersed in liquid that partially fills the inner cavity of the container but the bottom of the strainer-basket remains a spaced distance above the floor of the container.

11. A system according to claim 10 wherein a lip is formed on the strainer-basket and said lip abuts against a top rim of the container when the strainer-basket has been inserted to the submersed position, the abutment of the lip against the top rim of the container causing the bottom of the strainer-basket to remain a spaced distance above the floor of the container.

12. A system according to claim 10 wherein abutment of the lip against the rim of the container causes closure of the inner cavity of the container.

13. A system for cooking food, said system comprising:
a container having a top opening, a floor, a side wall and an inner cavity within which liquid may be placed such that the liquid partially fills the inner cavity;
a strainer-basket that is insertable through the top opening and into the inner cavity of the container, said strainer-basket having a side wall with indented regions formed therein, said indented regions having lateral edges; and
support pins extending inwardly from the side wall of the container, said support pins being configured to engage at least one engagement surface on the strainer-basket;
the strainer-basket being initially insertable to a submersed position within the inner cavity such that the support pins are received into the indented regions, rotation of the strainer-basket is limited by abutment of the support pins against the lateral edges of the indented regions and a lower portion of the strainer-basket becomes submersed within liquid that partially fills the inner cavity;
the strainer-basket being subsequently moveable from said submersed position to a draining position by i) vertically lifting the strainer-basket to a position where the support pins are no longer within the indented regions and, thus, rotation of the strainer-basket is no longer limited by abutment of the support pins against the lateral edges of the indented regions, ii) partially rotating the strainer-basket to a rotational orientation in which the support pins are aligned with at least one support pin engaging surface on the strainer-basket and iii) lowering the strainer-basket such that said at least one support pin engaging surface rests on said support pins so as to support the entire strainer-basket above liquid that partially fills the inner cavity.

14. A system according to claim 13 wherein the container has handles which are aligned with the support pins.

15. A system according to claim 13 wherein the indented regions are formed at diametrically opposite locations on the strainer-basket and the support pins protrude inwardly from the container side wall at diametrically opposite locations such that the support pins are receivable within the indented regions.

16. A system according to claim 15 wherein handles are affixed to the exterior of the container side wall and wherein the support pins serve to affix the handles to the side wall of the container as well as being operative to engage at least one corresponding support pin engaging surface on the strainer-basket when the strainer-basket is in the draining position.

17. A system according to claim 13 wherein the indented regions additionally have top edges and wherein each indented region extends from the bottom of the strainer-basket to the top edge of the indented region.

18. A system according to claim 14 wherein the handles, support pins and indentations are aligned with each other when the strainer-basket is in the submersed position.

19. A system according to claim 13 wherein the container and strainer-basket are further configured such that, when the strainer-basket is inserted to the submersed position, the bottom of the strainer-basket remains a spaced distance above the floor of the container.

20. A system according to claim 19 wherein a lip is formed on the strainer-basket and said lip abuts against a top rim of the container when the strainer-basket has been inserted to the submersed position, the abutment of the lip against the top rim of the container causing the bottom of the strainer-basket to remain a spaced distance above the floor of the container.

21. A system according to claim 20 wherein abutment of the lip against top the rim of the container causes closure of the inner cavity of the container.

* * * * *